United States Patent
Kuiper

(10) Patent No.: US 6,324,631 B1
(45) Date of Patent: Nov. 27, 2001

(54) METHOD AND SYSTEM FOR DETECTING AND COALESCING FREE AREAS DURING GARBAGE COLLECTION

(75) Inventor: Kean Gerome Kuiper, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,285

(22) Filed: Jun. 17, 1999

(51) Int. Cl.[7] .................................................. G06F 12/10
(52) U.S. Cl. ............................................. 711/170; 711/159
(58) Field of Search ..................................... 711/170, 171, 711/172

(56) References Cited

U.S. PATENT DOCUMENTS

| | | | |
|---|---|---|---|
| 5,088,036 | 2/1992 | Ellis et al. | 395/425 |
| 5,604,902 | 2/1997 | Burkes et al. | 395/622 |
| 5,687,368 | 11/1997 | Nilsen | 395/614 |
| 5,799,185 | * 8/1998 | Watanabe | 711/159 |

* cited by examiner

Primary Examiner—Matthew Kim
Assistant Examiner—Christian P. Chace
(74) Attorney, Agent, or Firm—Jeffrey S. LaBaw; Bracewell & Patterson, L.L.P.

(57) ABSTRACT

A threshold size of "interesting" free space regions (those areas that exceed a minimum size and are therefore worth recovering) is employed during garbage collection when detecting and reclaiming non-allocated memory space. For mark/sweep garbage collection, the threshold is based upon a number of consecutive zero mark bits in a mark bit array. The mark bit array, in which the liveness of each allocated data object is indicated by a logical "1" at the first memory segment of a live object and a logical "0" at the first memory segment for dead object, with the remaining memory segments being marked with a logical "0", is produced by the mark phase of a mark/sweep garbage collector. During the sweep phase, however, the mark bit array is processed instead of each object in memory. Interesting free space regions, which meet or exceed the threshold size and are targeted for de-allocation and coalescing, are identified from runs of consecutive zeros, with verification that the run corresponds to unused memory. This allows sequences of bits to be inspected concurrently at a high rate, eliminating the need to inspect objects individually and skipping small free space regions intermingled with live objects. By eliminating the need to examine each object for "liveness," groups of objects, represented by mark bits, are treated as aggregates which may be processed more quickly.

21 Claims, 6 Drawing Sheets

Initialize the search

Top:

While this byte of mark bits is not zero
        Move on to the next byte
    *(sequence hint, a byte of zero, is found)*
    If we are at or beyond the sentinal bit pattern
        The algorithm is complete Loop:

If we are on a word boundary
        While this word of mark bits is zero
            Move on to the next word *(e.g. skip 32 bits)*
    If this byte of mark bits is zero
        Move on to the next byte
        Goto Loop
    *(end of a possibly interesting sequence)*
    If the sequence of discovered zeroes is interesting
        Determine the length of the object at its start
        *(here relatively few are inspected for length)*
    If the remaining sequence is sufficiently large
        Return the remainder as free space
    Goto Top

*Fig. 4*

METHOD AND SYSTEM FOR DETECTING AND COALESCING FREE AREAS DURING GARBAGE COLLECTION

BACKGROUND OF THE INVENTION

1. Technical Field

The present invention relates in general to memory management within data processing systems and in particular to de-allocation and coalescing of free space memory within data processing systems. Still more particularly, the present invention relates to mark-sweep garbage collection memory management for object oriented programs within data processing systems.

2. Description of the Related Art

"Objects," when considered in the field of computer programming and operation, refer to a defined programming unit that is usually one of many building blocks of object oriented programs. An object consists of data and operations (termed methods) that can be performed on that data. One advantage of object-oriented programming over standard, procedural programming, is that objects allow programmers to create modules that do not need to be changed when a new type of object is added. Java™, a trademark of Sun Microsystems, Inc. of Palo Alto, Calif., is one example of an object-oriented programming language.

Objects literally occupy discrete regions of memory and are not permitted to overlap. In other words, an object has a defined area in memory that it does not share with any other object. There are different states of objects including "live" objects that are currently being utilized in an ongoing process. Live objects have lifetimes that may be accounted for in the program and die only when the last reference to the object disappears. "Dead" objects, or objects that are not live, are objects whose lifetimes have expired and will not be utilized further in the computational process. "Heap" refers to that portion of memory that is reserved for a program to utilize when storing data whose size or existence may not be determined ahead of time.

"Garbage" refers to data stored in memory that is no longer being utilized. "Garbage collection" is the automatic detection and freeing of memory that is no longer in use. Object oriented programming usually includes memory management functions that identify and free up memory within the heap that is not being utilized. Performing the function of garbage collection eliminates the need for programmers to explicitly de-allocate memory and automatically reduces memory fragmentation. Typically, a garbage collection procedure reclaims and provides storage dynamically rather than specifically allocating and de-allocating memory on a scheduled basis "Mark/sweep" is a specific type of garbage collection procedure that reclaims space by first marking all memory occupied by live objects on a first of two passes through memory. The first pass begins with at least one live anchor object (required for program operation) or root. This procedure involves recursively following pointers from a set of base pointers and setting mark bits (a bit on an object is set to one) within a memory allocation table for each storage area identified by a pointer within an actively used storage area. At the beginning of the mark function, all mark bits in the memory allocation table are set to zero. An initial mark bit, corresponding to the beginning of the live object, is set to one and mark bits corresponding to succeeding groups of bytes in the live object remain at zero. Mark bits, including the initial mark bit, remain at zero if the associated object is not a live object. After marking live objects, a second pass examines each object ("sweeping") by enumerating each object. As long as at least one live reference exists for an object, that object cannot be garbage-collected and storage containing the object may not be de-allocated; otherwise, the memory formerly occupied by the object is then de-allocated and made available for future allocations. Adjacent dead objects that have become available are coalesced into larger a free areas.

Referring to FIGS. 5A–5B, a high-level flow diagram of the mark/sweep method is illustrated. As the collection process is for determining live objects, the mark function begins at step 500, which depicts the beginning of a mark/sweep garbage collecting process wherein all mark bits are reset to zero, whether live or not. The process proceeds to step 502, which illustrates the process emptying the "pending" list (a list containing live objects that have been marked and are to be scanned later). The process then passes to step 504, which depicts the mark function setting a mark bit for each root object (an object known to be live). The process passes to step 506, which illustrates each root object being added to the pending list. The process proceeds to step 507, which depicts a determination of whether or not the pending list is empty. If so, the process passes to the sweep function as described in FIG. 5B. If the pending list is not empty, the process continues to step 508, which depicts the process extracting an object (live) from the pending list.

The process proceeds next to step 510, which illustrates a determination of whether or not the extracted object references any other object. If not, the process returns to step 507. If the object is determined to reference another object, the process instead passes from step 510 to step 512, which illustrates a determination of whether or not all referenced objects are marked. If so, the process proceeds to step 507 and repeats the cycle. If not, the process instead proceeds to step 514, which illustrates adding all referenced unmarked objects to the pending list. The process then continues to step 516, which illustrates marking all referenced unmarked objects. The process next passes to step 507, to check if the pending list is empty. The process proceeds to the sweep function of the mark/sweep garbage collection process if the list is empty. If the list is not empty, the process returns to step 508.

Referring now to FIG. 5B, the sweep phase of the mark/sweep garbage collection process is depicted. The process begins with step 518, which depicts the process finding the first object. The process then proceeds to step 520, which illustrates inspecting the object. The process then passes to step 522, which depicts a determination of whether or not the object is live by testing the mark bit. If the object is not live the process proceeds to step 524, which illustrates the sweep function de-allocating the object and reclaiming the space. The process continues to step 526, which depicts the de-allocated object being coalesced with any adjacent free space. The process next passes to step 528, which illustrates a determination of whether or not all objects in memory have been swept.

Returning to step 522, if the object is live, the sweep function ignores the object and the process then passes to step 528 where the determination is made whether all objects have been swept. If all objects have been swept, the process continues to step 532, which depicts the mark/sweep garbage collection procedure returning to an idle state. If not, the process instead passes to step 530 which illustrates the sweep function seeking another object.

Since the sweep algorithm examines each object on the heap sequentially, finding the "next" object must be extremely fast. Many mark/sweep algorithms choose to place a length field on each object, so that each object begins with a "length" field that describes the object's size. The next object (actually the length field of the next object) is found by adding the current object's length field to the address of the length field itself. For example:

| | |
|---|---|
| L1 | Length of A |
| | First word of A |
| | . |
| | . |
| | . |
| | Last word of A |
| L2 | Length of B |
| | First word of B |
| | Last word of B |
| | . |
| | . |
| | . |

L1 and L2 represents the addresses of the objects A and B, respectively. Given L1 we know where A is and B is found by adding "Length of A" to L1 to get L2. However, the length fields (Length of A, Length of B, etc.) occupy space in the heap. Since most objects tend to be small, a considerable amount of heap space is occupied by the length fields. If the length field information could be shared across many objects, memory in the heap could be conserved for program use.

The mark/sweep garbage collection scheme causes the system to stop all other operations while it is making the two passes through memory. The scheme processes live objects over and over and causes a considerable burden on the processor. Garbage collection runs repetitively and although its main benefit is to automatically reclaim memory storage to reduce memory design errors, it does expend processor time and interrupt ongoing applications. Since garbage collection is automatic and beyond the programmer's control, the collection process may become active at inconvenient times during an active program application.

"Copying" type garbage collectors move all live objects from one area to another area. In the new area, the live objects are copied to adjacent spaces, thereby eliminating any free space regions that may have separated them in the old area. The space the live objects were moved from is then considered empty. All the free space is treated as a single aggregate and no attention is paid to any dead object. However, implementing a copying scheme requires that any individual live object be movable during garbage collection. A disadvantage with copying garbage collectors is that garbage collection takes place more frequently because only half of the available memory is used at any one time.

It would be desirable, therefore, to provide a method and apparatus that would tolerate situations where objects may not be moved. It would also be desirable to reduce the burden on the system processor(s) by eliminating the need to examine each object in memory. It would further be desirable to provide a method and apparatus that would reduce the time required to interrupt an ongoing program application.

SUMMARY OF THE INVENTION

It is therefore one object of the present invention to provide an improved method and apparatus for memory management within data processing systems.

It is another object of the present invention to provide an improved method and apparatus for de-allocation and coalescing of free space memory within data processing systems.

It is yet another object of the present invention to provide an improved method and apparatus for mark-sweep garbage collection memory management for object oriented programs within data processing systems.

The foregoing objects are achieved as is now described. A threshold size of "interesting" free space regions (those areas that exceed a minimum size and are therefore worth recovering) is employed during garbage collection when detecting and reclaiming non-allocated memory space. For mark/sweep garbage collection, the threshold is based upon a number of consecutive zero mark bits in a mark bit array. The mark bit array, in which the liveness of each allocated data object is indicated by a logical "1" for the first memory segment of a live object and a logical "0" for the first memory segment of a dead object, with the remaining array elements corresponding to other segments being marked with a logical "0", is produced by the mark phase of a mark/sweep garbage collector. During the sweep phase, however, the mark bit array is processed instead of each object in memory. Interesting free space regions, which meet or exceed the threshold size and are targeted for de-allocation and coalescing, are identified from runs, or sequences, of consecutive zeros with verification that the run corresponds to unused memory. This allows sequences of bits to be inspected concurrently at a high rate, eliminating the need to inspect objects individually and skipping small free space regions intermingled with live objects. By eliminating the need to examine each object for "liveness," groups of objects, represented by mark bits, are treated as aggregates which may be processed more quickly.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 depicts pseudo-code for a process of inspecting a mark bit array during the sweep phase of mark-sweep garbage collection in accordance with a preferred embodiment of the present invention.

DETAILED DESCRIPTION OF THE PREFERRED EMBODIMENT

Figure 1:
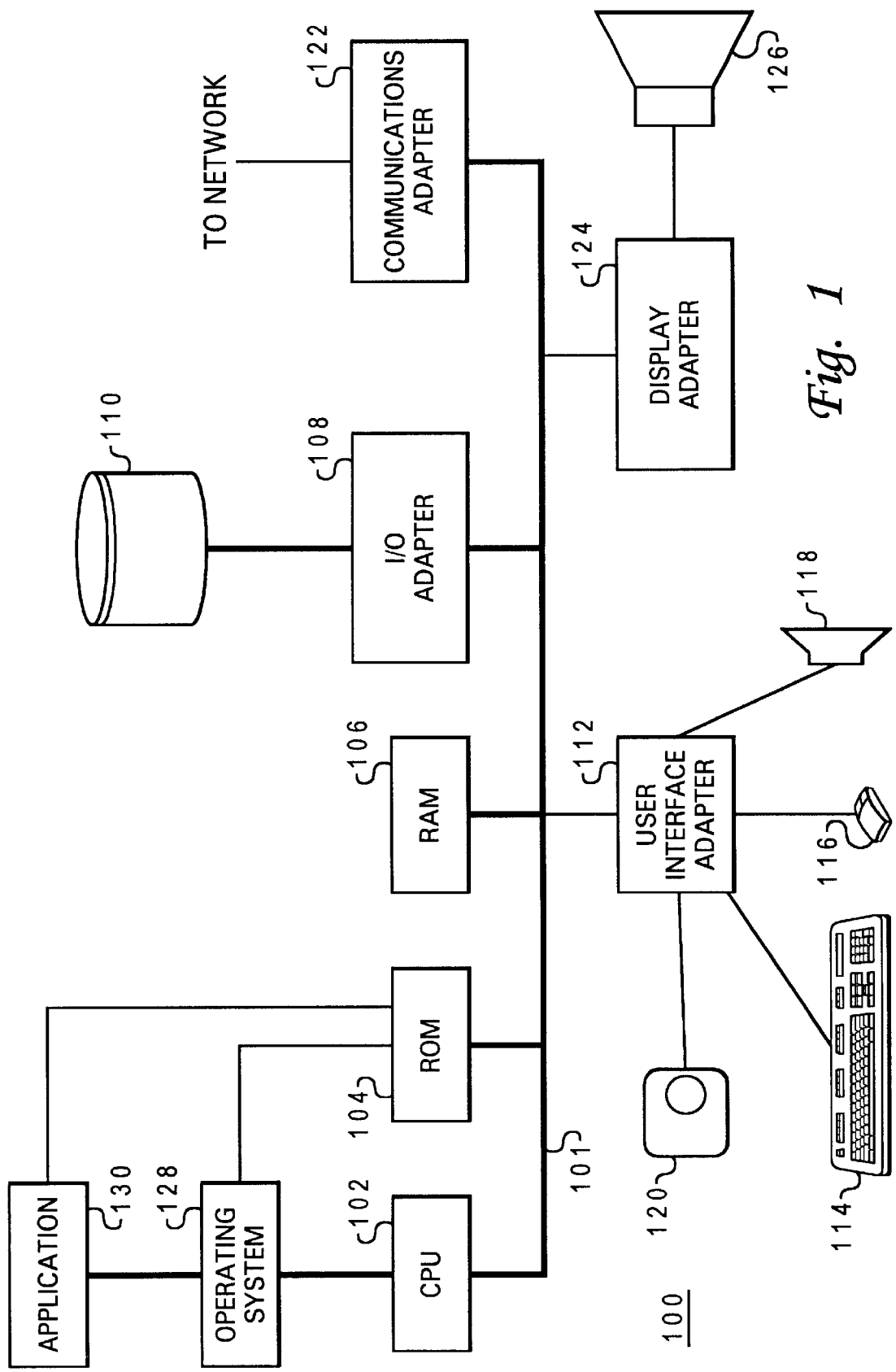
FIG. 1 depicts a diagram of a data processing system in which a preferred embodiment of the present invention may be implemented.

Referring to FIG. 1, a typical data processing system, in which a preferred embodiment of the present invention may be implemented, is depicted. A central processing unit (CPU) 102, such as one of the PC microprocessors available from International Business Machines Corporation (IBM), is provided and interconnected to various other components by system bus 101. An operating system 128 runs on CPU 102, provides control and is used to coordinate the function of various components of FIG. 1. Operating system 128 may be one of the commercially available operating systems such as the JavaOS™ operating system available from Sun Microsystems (JavaOS is a trademark of Sun Microsystems, Inc. of Palo Alto, Calif.). A program incorporating objects, application 130, runs in conjunction with operating system 128 and provides output calls to operating system 128 which implement the various functions to be performed by application 130.

Read only memory (ROM) 104 is connected to CPU 102, via bus 101 and includes the basic input/output system (BIOS) that controls basic computer functions. Random access memory (RAM) 106, I/O adapter 108 and communications adapter 122 are also interconnected to system bus 101. It should be noted that software components, including operating system 128 and application 130, are loaded into RAM 106, which is the computer system's main memory. I/O adapter 108 may be an Enhanced Integrated Drive Electronics (EIDE) or Peripheral Component Interface (PCI) adapter that communicates with disk storage device 110. Communications adapter 122 interconnects bus 101 with an outside network enabling data processing system 100 to communicate with other such systems over a local area network (LAN) or wide area network (WAN), which includes the Internet. I/O devices are also connected to system bus 101 via user interface adapter 112 and display adapter 124 through various components such as a digital to analog converter (not shown) and the like. By using the aforementioned I/O devices, a user is capable of entering information to the system through keyboard 114, trackball 120 or mouse 116 and receiving output information from the system via speaker 118 and display 126.

Figure 2:
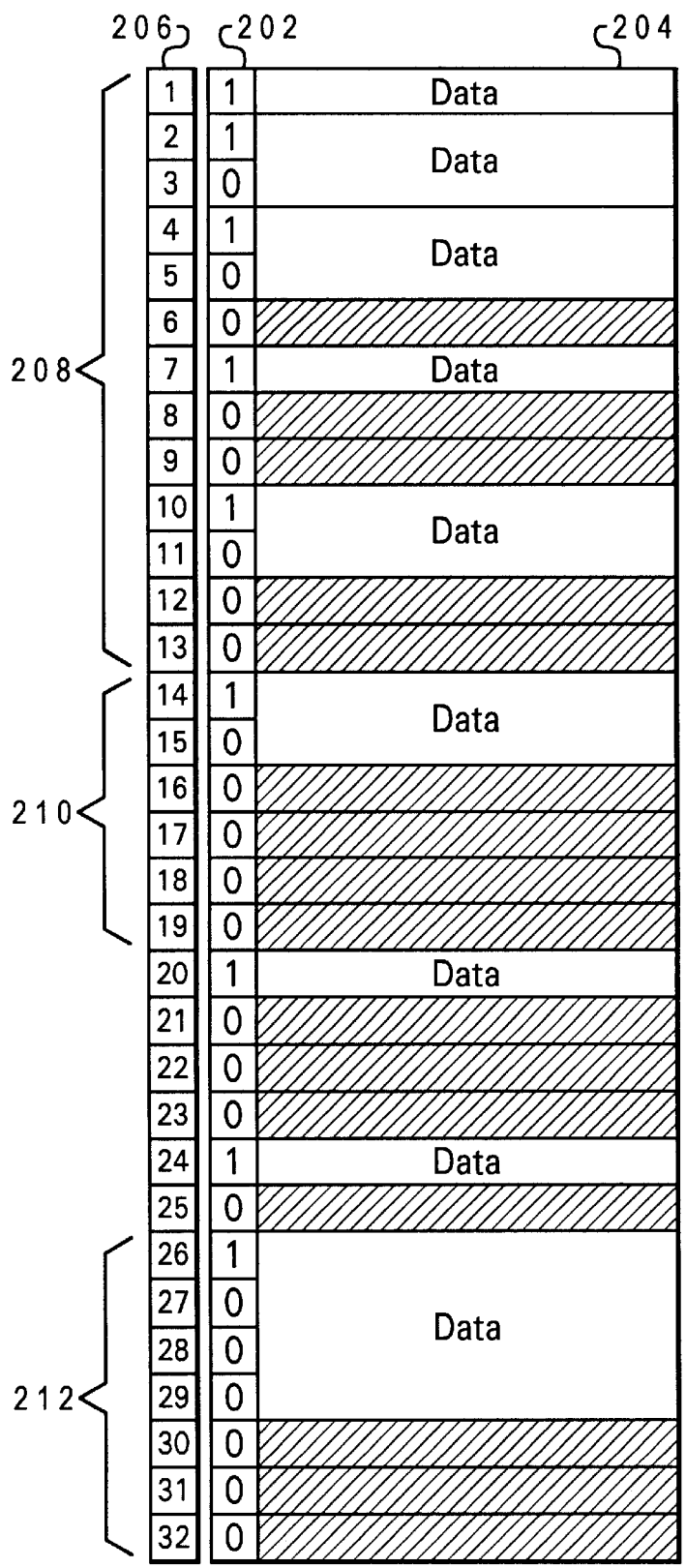
FIG. 2 is a block diagram of a mark bit array data structure with associated memory segments employed in mark-sweep garbage collection in accordance with a preferred is embodiment of the present invention.

Referring now to FIG. 2, a block diagram of a mark bit array data structure, with associated memory segments employed in mark-sweep garbage collection, in accordance with a preferred embodiment of the present invention is illustrated. Mark bit array 202 consists of a dense array of bits describing the liveness of each object within a corresponding portion of memory 204, which are set or not set during the mark phase of mark-sweep garbage collection. Mark bits within array 202 are shown adjacent to a corresponding memory segment within memory 204; in practice however, mark bits are not likely to actually be adjacent to the corresponding memory segments.

During the mark phase, one bit is set corresponding to the beginning of each live object with the memory heap. All other objects (not live), and bits which do not correspond to the beginning of an object, have mark bits of zero. List 206, which enumerates mark bits within mark bit array 202, has been included in this illustration to facilitate description of the present invention, but does not form part of the data structure of the present invention.

Regions of memory 204 which contain live data are identified in the diagram as "data," while regions which do not contain live data objects are designated by cross-hatching. As illustrated, the first bit associated with each adjacent "data" region—forming part of a live object—is marked with a logical "1", while all other bits within array 202 are set to a logical "0".

In the example shown, for instance, mark bits 1–5, 7, 10–11, 14–15, 20, 24, and 26–29 within array 202 all correspond to live objects; while mark bits 6, 8–9, 12–13, 16–19, 21–23, 25 and 30–32 correspond to memory regions which do not contain live data. Mark bits 1, 2, 4, 7, 10, 14, 20, 24, and 26 within array 202 are all set to a logical "1", as they correspond to the first memory segment of a live data object.

In the present invention, a threshold value is set that determines whether or not an area of memory is examined by the "Bitwise Sweep" function of the mark-sweep garbage collection scheme of the present invention. The present invention exploits the fact that "interesting" free space regions (those which exceed a minimal size) result in a significant sequence of consecutive zeros in mark bit array 202. Processors provide efficient tests determining whether bytes and words contain all zeros, tests which generally last only one processor cycle. Therefore it is possible to inspect groups of bits together at a high rate to determine if all bits within the group are zeros.

In the example illustrated, the threshold value is set at 4 bits, where any sequence of zeros less than four is ignored and any sequence of four or more zeros is inspected. Thus, bits 1–13 (sequence 208) are quickly eliminated since no run of at least four zeros is identified within that range. The sweep phase of the present invention will therefore skip over all bits up to sequence 210. However, an interesting region, sequence 210, which includes mark bits 15–19 (five zero bits) is detected.

A live object sequence corresponds to mark bits 14 and 15, where bit position 14 is the first mark bit within array 202 of a live object with a first byte in the memory segment associated with mark bit 14 and extending into the memory segment associated with mark bit 15. However, mark bit array 202 positions 14 through 19 may correspond to a single live object, so the sweep phase of the present invention needs to inspect the size of the data object corresponding to mark bit position 14. The data object is determined to occupy two memory segments, corresponding to mark bit positions 14 and 15. The remaining memory segments corresponding to mark bit positions 14–19 —that is, those which correspond to mark bit positions 16–19 —are determined not to contain any live data.

Even though bit positions 14–15 correspond to live object (s), the motivation for inspecting the memory segments corresponding to sequence 210 is the number of consecutive zero mark bits detected within array 202 (five, at bit positions 15–19). Only four consecutive memory segments are found which contain "dead" data, and these memory segments may be de-allocated and coalesced by the garbage collection process since the threshold of four consecutive zero mark bits is met.

Continuing with the example shown, the sweep phase of the present invention skips over bit positions 21–25 because the threshold of four consecutive zero bits is not met. However, sequence 212 of bit positions 26–32 is inspected because there are more than four consecutive zeros in mark bit array 202 in these positions. As the sweep phase inspects the memory segments corresponding to sequence 212, it determines that memory segments associated with mark bits 27–29 refer to a live object beginning at the memory segment associated with bit position 26. Therefore, all of the inspected memory segments may be ignored—including the memory segments corresponding to bit positions 30–32— since a threshold size of free space is not satisfied. However, as discussed and depicted in FIG. 3, a "sufficiently large" free space may be included with interesting sequences in the de-allocation step.

As FIG. 2 demonstrates, mark bit array 202 may be quickly scanned with only two interesting sequences being detected and inspected. The sweep phase of the present invention thus only inspects the memory segments corresponding to bit positions 15–19 and 27–32, ignoring all other memory segments. This can be accomplished significantly faster than inspection of each data object.

As demonstrated, sequences of live objects, possibly intermingled with uninteresting free space regions, may be quickly skipped. Large sequences of free space (having corresponding runs of zeros in mark bit array 202) may be processed at a high rate. The remaining work is to inspect the object that precedes each interesting run of zero bits. As only one bit is set per object (which may be many bytes long), it is possible that a large run of zeros may describe a large object. However, since most objects are small, a threshold value may be chosen so that examining an occasional large object does not result in excessive processing time.

The description above relates to bitwise inspection of bits within mark bit array 202. In practice, however, the threshold run of zeros which indicates interesting free space may be set at a number much larger than four. The number of consecutive zeros which is selected as a threshold for identifying interesting regions may be selected to balance the speed of the memory sweep with reclamation of unused memory. Thus, the mark bit array may be processed by looking for bytes or words of consecutive zeros within mark bit array 202, further improving the speed of the sweep phase. The processor instructions described above may be employed for this purpose.

Figure 3:
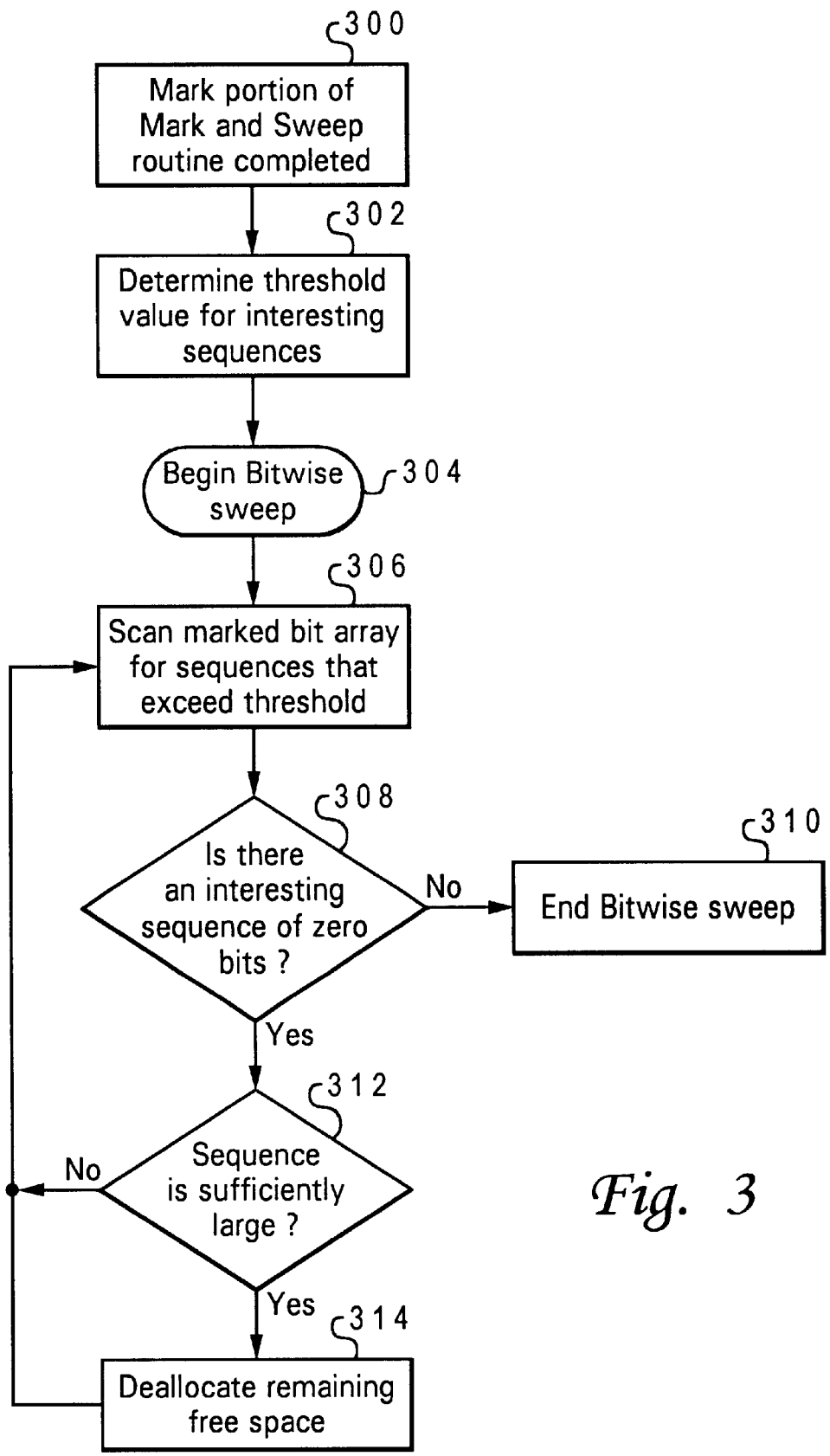
FIG. 3 depicts a high level flowchart for a process of examining a mark bit array during the sweep phase of mark-sweep garbage collection in accordance with a preferred embodiment of the present invention.
Figure 5A:
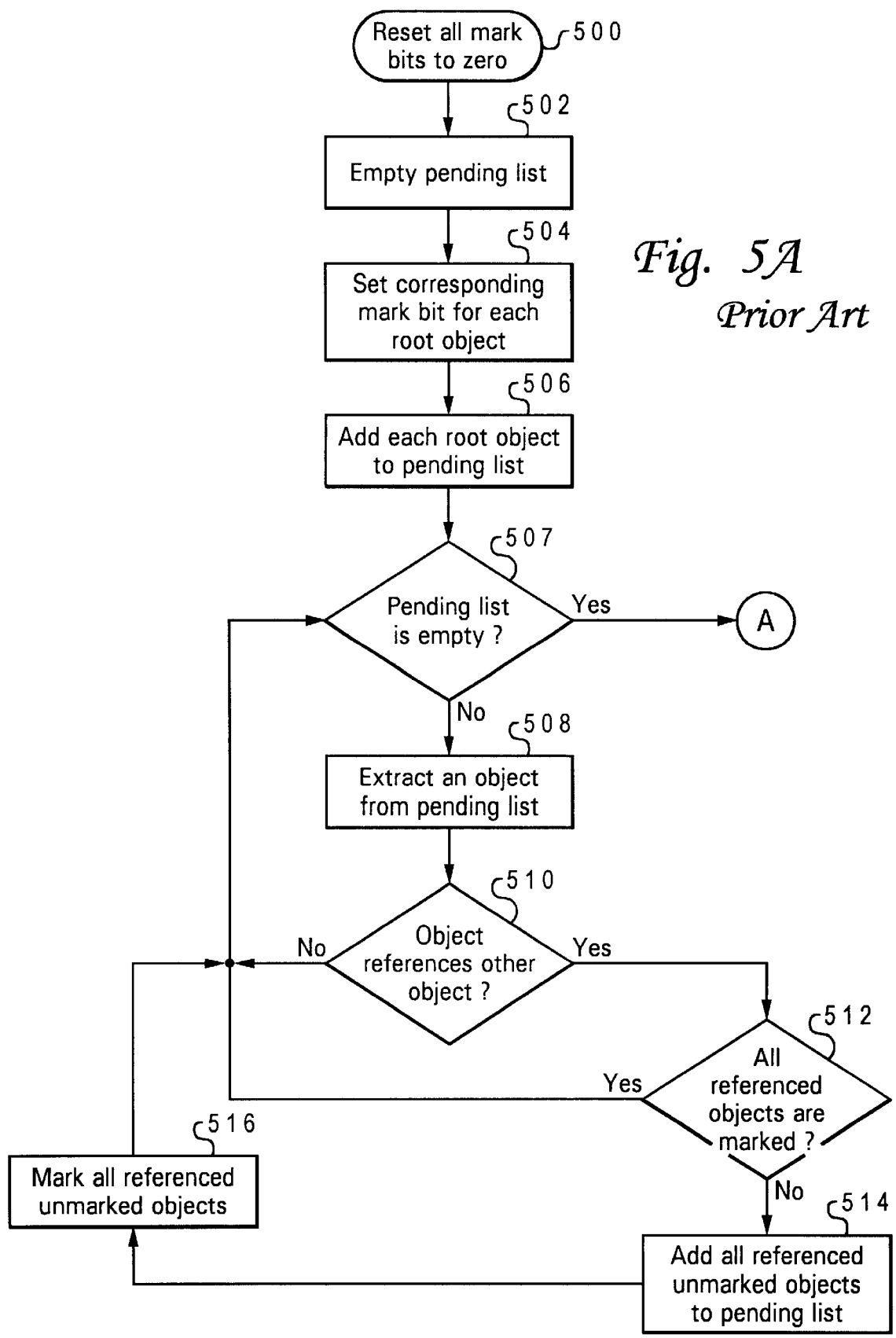
FIGS. 5A–5B are a high-level flow diagram of a known mark-sweep method of garbage collection for detecting and coalescing free areas of memory.
Figure 5B:
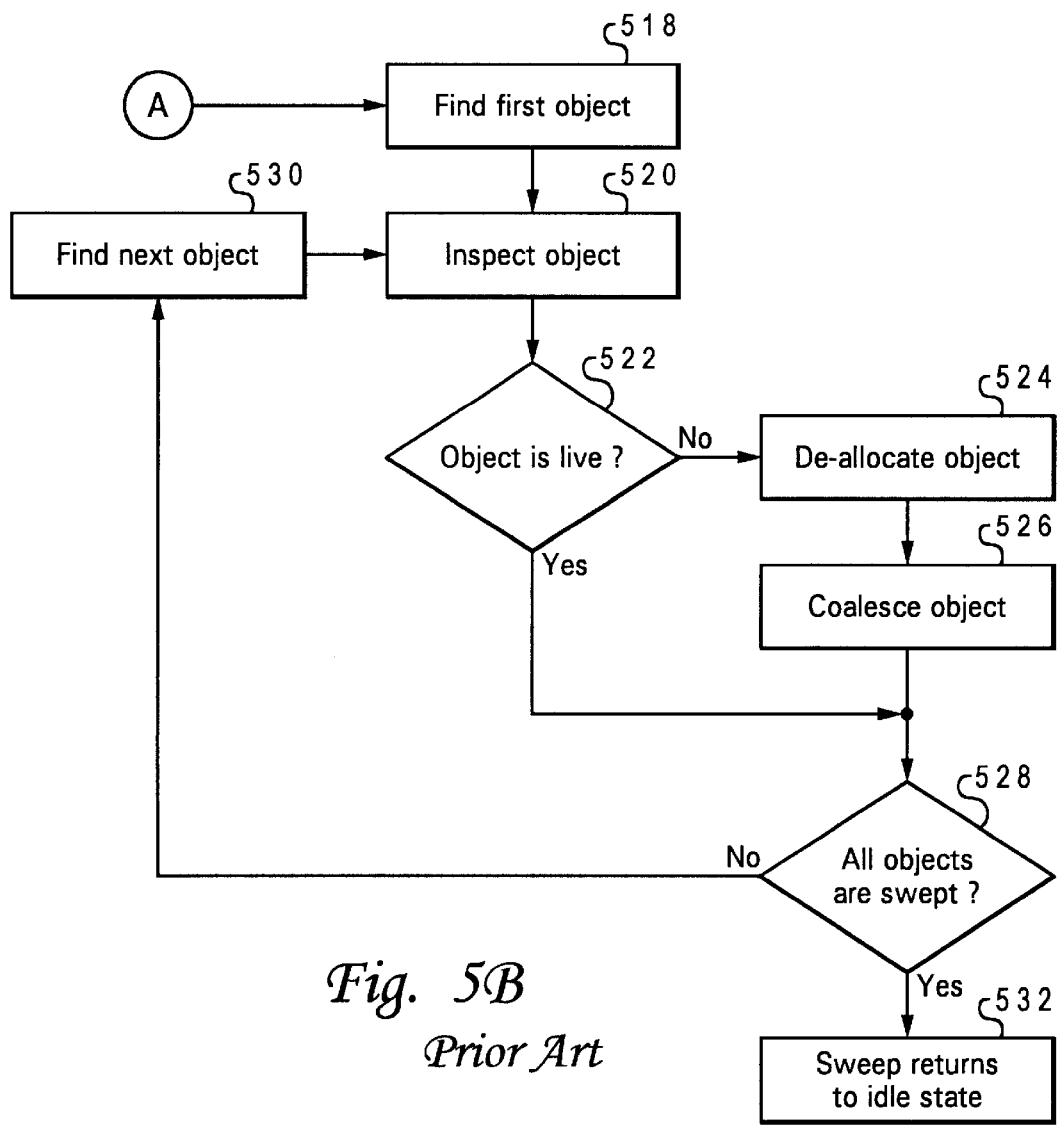

Referring to FIG. 3, a high level flowchart for a process of examining a mark bit array during the sweep phase of mark-sweep garbage collection in accordance with a preferred embodiment of the present invention is depicted. The process begins with step 300, which depicts the mark function of the mark/sweep garbage collection, described previously in connection with FIGS. 4A and 4B, as having been completed. The sweep function of the process, however, is the sweep process described above, in connection with FIG. 2, as opposed to the sweep process of a normal mark-sweep garbage collection routine.

The process next passes to step 302, which illustrates a threshold value for interesting sequences (also referred to as interesting regions) being set (may be pre-selected by designer or dynamically determined by system requirements) and applied during the sweep function. The threshold value is at least a minimum size, with free space regions smaller than the threshold value being ignored. In practice, nearly all free space is discovered because it is possible to choose a threshold value where only a small fraction of all free space consists of regions smaller than the threshold. By removing the need to examine each individual object, the present invention ignores most live objects by treating groups of live objects as aggregates (adjacent live objects, none large enough to cause the threshold of zero mark bits to be exceeded) which may be processed much more quickly.

The process next proceeds to step 304, which depicts the sweep function, activating and beginning to examine bits. The process proceeds to step 306, which illustrates the sweep function scanning the mark bit array for sequences, representing free space regions, that exceed the threshold value. All live objects have been marked with one's and dead objects have been marked with zeros and those values are stored in the marked bit array. The sweep function scans the mark bit array, and since processors provide efficient tests for bytes and words of all zero, it is possible to inspect groups of bits together at a high rate. Runs of live objects, possibly intermingled with uninteresting free space regions, may be skipped. Large runs of free space (that is, corresponding zeros in the mark bit array) may also be scanned at a high rate.

The process passes to step 308, which depicts a determination made whether there is an interesting sequence of bits (that is, a run of zeros that meet or exceed the threshold value). If there are no interesting sequences, the process then passes to step 310, which illustrates the sweep function ending and the mark-sweep garbage collection routine of the invention resetting for the next procedure. If there is an interesting sequence, the process proceeds to step 312, which depicts a determination of whether the interesting sequence is sufficiently large (i.e., "sufficiently large" may include three bits, whereas an interesting sequence is four bits). If not, the process returns to step 306, and repeats step 306 and 308. If the sequence is sufficiently large, the process then passes instead to step 314, which illustrates de-allocating the remaining free space region represented by the subject zero mark bits. The process then returns to step 306 and continues.

Interesting sequences and sequences that are sufficiently large may all be considered for coalescing. A sufficiently large sequence (a specified number of bits less than the threshold number) may be coalesced if it has been detected as an interesting sequence. A sufficiently large sequence is always contained within an interesting sequence. By including sufficiently large sequences, the process may gain space that otherwise may be skipped. Since the process has already detected and inspected an interesting sequence and the sequence has a specified number of bits less than the threshold, this sequence that doesn't meet threshold requirements but is sufficiently large and included for coalescing.

Referring to FIG. 4, pseudo-code for a process of inspecting a mark bit array during the sweep phase of mark-sweep garbage collection in accordance with a preferred embodiment of the present invention is depicted. The pseudo-code is annotated with comments (in parentheses and bold type) regarding performance of the corresponding process. As illustrated, the process utilizes instructions looking for bytes and words of consecutive zeros.

If the interesting sequence is long enough, it is possible to use a sequence hint (a sequence of bits that may be rapidly examined, that must be present in an interesting sequence; i.e., an aggregate of eight bits on an eight bit boundary) to speed discovery of an interesting sequence. If the sequence is sufficiently long enough, it must contain some minimal number of zero mark bits (in the example eight bits, all zero, in a row, on a byte boundary). Since every interesting sequence will require the minimal number, the process of finding an interesting sequence may be speeded up by looking for an entire collection of a minimal number of bits that are zero.

While exploring a sequence of zero mark bits, it is possible to optimize the search by utilizing machine instructions that process entire words of bits. At each word boundary within the memory region, the process looks for a word of consecutive zeros within the associated mark bit array. If identified, the next word is examined; if the word does not contain all zeros, however, the word is examined byte by byte for consecutive zeros. As each byte of consecutive zeros is identified, the next byte is inspected. When a byte not containing all zeros is identified, the run of consecutive zeros identified is examined to determine if it exceeds the threshold.

If the run of consecutive zeros identified exceeds the threshold, the length of the object at the beginning of the run is examined and compared to the size of the run. If the remaining space is sufficiently large, the free space is de-allocated and returned to the memory heap. If not, however, the free space is ignored and the next word is examined.

In order to prevent the sweep function from exceeding the heap boundary, a "sentinel" (a word containing a non-zero bit which terminates the last live object or free space on the heap) is set. The process checks for a sentinel pattern as each word boundary, after the first word, is encountered. If detected, the end of the memory heap has been encountered. Otherwise, the next word is examined first for all zeros, and then byte-wise if the entire word does not contain all zeros.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for detecting and coalescing individual free space regions, comprising:
   examining a mark bit array for interesting sequences, wherein the interesting sequences each include a threshold number of sequential bits having a first logical state; and
   during a memory sweep, ignoring any memory region corresponding to bits within the mark bit array which do not form a part of an interesting sequence.

2. The method of claim 1, further comprising:
   during the memory sweep, examining each memory region corresponding to each interesting sequence within the mark bit array.

3. The method of claim 2, further comprising:
   responsive to identifying a memory region which does not contain live objects, de-allocating the memory region.

4. The method of claim 1, further comprising:
   setting the threshold number of sequential bits to balance speed of the memory sweep with finding every non-live object during the memory sweep.

5. The method of claim 1, further comprising:
   at each word boundary within the mark bit array, examining an adjoining word length of bits for a word of consecutive zeros.

6. The method of claim 5, wherein the step of examining an adjoining word length of bits for a word of consecutive zeros further comprises:
   if the adjoining word length of bits does not contain all zeros, byte-wise examining the adjoining word length of bits for consecutive zeros.

7. A method for detecting and coalescing individual free space regions, comprising the steps of:
   identifying each sequence hint within a mark bit array, wherein the sequence hint is a sequence of bits having a threshold number of consecutive zero bits terminating on a byte boundary;
   examining each memory region corresponding to an identified sequence hint; and
   responsive to determining that a memory region corresponding to an identified sequence hint does not contain live objects, de-allocating the memory region.

8. The method of claim 7, further comprising:
   utilizing each sequence hint to identify each interesting sequence within the mark bit array, wherein an interesting sequence includes a run of consecutive zero bits of a predetermined size.

9. A method for detecting and coalescing individual free space regions, comprising:
   examining a mark bit array for an interesting sequence, wherein the interesting sequence includes a first threshold number of sequential bits having a first logical state;
   examining each memory region corresponding to an interesting sequence within the mark bit array; and
   responsive to identifying a memory region containing a number of unused, adjacent memory segments corresponding to a run of mark bits less than the first threshold number but greater than or equal to a second threshold number, de-allocating the identified memory region.

10. A system for detecting and coalescing individual free space regions, comprising:
    a memory within a data processing system;
    a mark bit array within a portion of the memory including a mark bit for each memory segment within the memory which may be allocated for data storage;
    a garbage collection process executing within the data processing system, the garbage collection process:
    examining a mark bit array for interesting sequences, wherein an interesting sequence includes a threshold number of sequential bits having a first logical state; and
    during a memory sweep, ignoring any memory region corresponding to bits within the mark bit array which do not form a part of an interesting sequence.

11. The system of claim 10, wherein the garbage collection process, during the memory sweep, examines each memory region corresponding to an interesting sequence within the mark bit array.

12. The system of claim 11, wherein the garbage collection process, responsive to identifying a memory region which does not contain live objects, de-allocates the memory region.

13. The system of claim 10, wherein the threshold number of sequential bits is selected to balance speed of the memory sweep with finding every non-live object during the memory sweep.

14. The system of claim 10, wherein the garbage collection process, during the memory sweep, examines an adjoining word length of bits for a word of consecutive zeros at each word boundary within the mark bit array.

15. The system of claim 14, wherein the garbage collection process byte-wise examines the adjoining word length of bits for consecutive zeros if the adjoining word length of bits does not contain all zeros.

16. A computer program product for detecting and coalescing individual free space regions within a computer usable medium, comprising:

instructions for examining a mark bit array for interesting sequences, wherein the interesting sequences each include a threshold number of sequential bits having a first logical state; and instructions for ignoring any memory region corresponding to bits within the mark bit array which do not form a part of an interesting sequence during a memory sweep.

17. The computer program product of claim 16, further comprising:

instructions for examining each memory region corresponding to each interesting sequence within the mark bit array during the memory sweep.

18. The computer program product of claim 17, further comprising:

instructions, responsive to identifying a memory region which does not contain live objects, for de-allocating the memory region.

19. The computer program product of claim 16, further comprising:

instructions for setting the threshold number of sequential bits to balance speed of the memory sweep with finding every non-live object during the memory sweep.

20. The computer program product of claim 16, further comprising:

instructions for examining an adjoining word length of bits for a word of consecutive zeros at each word boundary within the mark bit array.

21. The computer program product of claim 20, wherein the instructions for examining an adjoining word length of bits for a word of consecutive zeros further comprise:

instructions for byte-wise examining the adjoining word length of bits for consecutive zeros if the adjoining word length of bits does not contain all zeros.

* * * * *